(12) United States Patent
Carlini (10) Patent No.: US 12,331,797 B2
(45) Date of Patent: Jun. 17, 2025

(54) METHOD OF CARBURIZING DRIVELINE COMPONENTS

(71) Applicant: Aircraft Gear Corporation, Loves Park, IL (US)

(72) Inventor: Sean M. Carlini, Rockford, IL (US)

(73) Assignee: Aircraft Gear Corporation, Loves Park, IL (US)

( * ) Notice: Subject to any disclaimer, the term of this patent is extended or adjusted under 35 U.S.C. 154(b) by 482 days.

(21) Appl. No.: 17/331,333

(22) Filed: May 26, 2021

(65) Prior Publication Data

US 2021/0372485 A1 Dec. 2, 2021

Related U.S. Application Data

(60) Provisional application No. 63/030,046, filed on May 26, 2020.

(51) Int. Cl.
*C23C 8/22* (2006.01)
*C21D 1/06* (2006.01)
(Continued)

(52) U.S. Cl.
CPC .............. *F16D 3/224* (2013.01); *C21D 1/06* (2013.01); *C23C 8/04* (2013.01); *C23C 8/22* (2013.01); *F16D 3/2057* (2013.01); *F16D 2003/22303* (2013.01); *F16D 2003/22309* (2013.01); *F16D 2200/0021* (2013.01); *F16D 2200/0082* (2013.01); *F16D 2250/0053* (2013.01); *F16D 2300/10* (2013.01); *Y10S 29/026* (2013.01);
(Continued)

(58) Field of Classification Search
CPC ................... F16D 3/224; F16D 3/2057; F16D 2003/22303; F16D 2003/22309; F16D 2200/0021; F16D 2200/0082; F16D 2250/0053; F16D 2300/10; C21D 1/06; C23C 8/04; C23C 8/22; Y10S 29/026; Y10S 29/049; Y10S 464/906; Y10T 29/49707
USPC ........................................................ 29/898.13
See application file for complete search history.

(56) References Cited

U.S. PATENT DOCUMENTS 2,397,585 A 4/1946 Anderson
3,159,013 A 12/1964 Mazziotti
(Continued)

FOREIGN PATENT DOCUMENTS

DE 102016219405 10/2017
DE 102018001449 8/2019
(Continued)

OTHER PUBLICATIONS

Universal Joint and Driveshaft Design Manual, AE-7, Society of Automotive Engineers, Inc., Warrendale, PA, Sections 3.1.1 and 3.2.8, TJ1079.S62. (Year: 1979).*
(Continued)

*Primary Examiner* — Greg Binda
(74) *Attorney, Agent, or Firm* — John V. Daniluck; Dentons Bingham Greenebaum LLP (57) ABSTRACT

A universal joint or other vehicle driveline assembly includes an inner race, an outer race, and bearings positioned between the races. In some embodiments, the components of the universal joint that are in contact with the bearings are selectively processed to be harder than the other non-contact surfaces of the component.

9 Claims, 9 Drawing Sheets

(51) Int. Cl.
*C23C 8/04* (2006.01)
*F16D 3/205* (2006.01)
*F16D 3/224* (2011.01)
*F16D 3/223* (2011.01)

(52) U.S. Cl.
CPC .......... *Y10S 29/049* (2013.01); *Y10S 464/906* (2013.01); *Y10T 29/49707* (2015.01)

(56) References Cited

U.S. PATENT DOCUMENTS

| | | | |
|---|---|---|---|
| 3,446,507 | A | 5/1969 | Ulics |
| 3,630,551 | A | 12/1971 | Brown |
| 3,885,995 | A | 5/1975 | Cunningham et al. |
| 4,371,358 | A | 2/1983 | Laue |
| 5,507,580 | A * | 4/1996 | Dezzani .................. F16C 7/02 |
| 6,390,924 | B1 | 5/2002 | Yoshida et al. |
| 6,673,167 | B2 | 1/2004 | Yoshida et al. |
| 7,025,684 | B2 * | 4/2006 | Frana .................. F16D 3/224 |
| | | | 464/906 |
| 7,094,155 | B2 | 8/2006 | Hosoya et al. |
| 7,357,724 | B2 | 4/2008 | Nakawawa et al. |
| 7,641,564 | B2 | 1/2010 | Usui et al. |
| 7,691,000 | B2 | 4/2010 | Nagayama et al. |
| 7,717,796 | B2 | 5/2010 | Hirakawa |
| 8,118,682 | B2 | 2/2012 | Kohana et al. |
| 8,273,188 | B2 | 9/2012 | Yoshida |
| 8,435,125 | B2 | 5/2013 | Doba et al. |
| 8,529,708 | B2 | 9/2013 | Locke |
| 8,646,181 | B2 | 2/2014 | Baumann et al. |
| 8,673,092 | B2 | 3/2014 | Morimoto et al. |
| 8,771,086 | B2 | 7/2014 | Yoshida et al. |
| 9,816,565 | B2 | 11/2017 | Yoshida et al. |
| 9,856,906 | B2 | 1/2018 | Yoshida et al. |
| 10,544,833 | B2 * | 1/2020 | Abrahamson ......... F16C 33/588 |
| 2004/0053700 | A1 | 3/2004 | Komeyama et al. |
| 2004/0242337 | A1 | 12/2004 | Frana et al. |
| 2005/0272510 | A1 | 12/2005 | Nakagawa et al. |
| 2008/0032804 | A1 | 2/2008 | Nagayama et al. |
| 2008/0248884 | A1 | 10/2008 | Ishijima et al. |
| 2009/0008892 | A1 * | 1/2009 | Gaumer .................. F16C 11/02 |
| 2009/0054276 | A1 | 2/2009 | Himeno et al. |
| 2010/0323934 | A1 | 12/2010 | Kondo et al. |
| 2015/0217329 | A1 | 8/2015 | Iwamoto et al. |

FOREIGN PATENT DOCUMENTS

| | | |
|---|---|---|
| EP | 2214862 | 8/2010 |
| FR | 2541399 | 8/1984 |
| FR | 2543864 | 10/1984 |
| GB | 2319584 | 5/1998 |
| WO | 2005019665 | 3/2005 |
| WO | 2007083485 | 7/2007 |
| WO | 2007102533 | 9/2007 |
| WO | 2011052342 | 5/2011 |
| WO | 2011065400 | 6/2011 |
| WO | 2012039255 | 3/2012 |
| WO | 2012172940 | 12/2012 |
| WO | 2013122100 | 8/2013 |
| WO | 2012117920 | 9/2013 |
| WO | 2013154015 | 10/2013 |

OTHER PUBLICATIONS

PCT/US2021/034298, USPTO, Search Report & Written Opinion, 10 pgs. Sep. 6, 2021.

* cited by examiner

METHOD OF CARBURIZING DRIVELINE COMPONENTS

CROSS REFERENCE TO RELATED APPLICATION

This application claims the benefit of priority to U.S. Provisional Patent Application Ser. No. 63/030,046, filed May 26, 2020, entitled METHOD OF CARBURIZING A BEARING CAGE, incorporated herein by reference.

FIELD OF THE INVENTION

The present invention relates to mechanical joints and particularly to universal joints. More particularly, the present invention relates a universal joint in which the surfaces of the bearing areas are processed to be harder than the surfaces of the non-bearing areas of the universal joint.

SUMMARY OF THE INVENTION

The high stresses placed on universal joints and particularly on the ball cages of constant velocity (CV) universal joints cause the cages to fatigue and fail. Particularly, in off-road vehicles, universal joints in the wheels of the vehicles undergo extreme stresses. A universal joint having a high-strength ball cage would be welcomed by users of such joints. The various embodiments described and shown herein include apparatus and methods generally applicable to any vehicle driveline assembly that includes rotating bearings. Preferably, but not necessarily, the driveline assemblies include driving and driven members interconnected by a bearing that accounts for misalignments and angular motions of one member relative to the other member.

In one embodiment of the present invention, a component of a universal joint is hardened overall to a first hardness. Surfaces of that component that contact a bearing are then preferably processed by carburization to a second hardness that is harder than the first hardness. This selective carburizaiton provides improved wear characteristics, while maintaining the overall toughness of the component without increasing the brittleness of the component.

In another embodiment, a component of a universal joint is selectively case hardened by masking off areas of the component that are not to be surface hardened, followed by case hardening of the remaining unmasked areas. In some embodiments this is achieved by masking off all surfaces of the component and then machining or otherwise removing the masking material from the surfaces on which case hardening (such as by diffusion of carbon, nitrogen, or other material) is desired. The case hardening process is applied to the overall component, although the diffusion of the material (such as carbon) is prevented by the masking on selected areas of the component.

According to one embodiment of the present invention, a universal joint comprises an outer race and an inner race movable within the outer race. A cage is movably positioned between the inner race and the outer race and has a first ring, a second ring positioned substantially parallel to and spaced apart from the first ring, and a plurality of webs extending between and positioned substantially perpendicularly to the first and second rings. In some embodiments, the surfaces of the webs are hardened to a Rockwell hardness greater than the Rockwell hardness elsewhere on the cage. A plurality of balls is positioned between the webs.

According to another embodiment of the present invention, a universal joint comprises an outer race and an inner race moveable within the outer race. A cage is moveably positioned between the inner race and the outer race and includes a first ring, a second ring positioned substantially parallel to and spaced apart from the first ring, and a plurality of webs extending between and positioned substantially perpendicularly to the first and second rings. The first ring and second ring include portions of decreased hardness relative to the surfaces of the cage. A plurality of balls is positioned between the webs.

According to another embodiment of the present invention, a universal joint comprises an inner race, an outer race movably positioned around the inner race, and a ball cage moveably positioned between the inner race and the outer race. The ball cage is shaped to form a hollow, truncated sphere having a plurality of windows extending from an outer surface of the hollow, truncated sphere to an inner surface of the hollow, truncated sphere. The windows separate first and second sections of the hollow, truncated sphere and the width of the first section is greater than the width of the second section. A plurality of balls is positioned within the windows. The surfaces of the windows are case hardened.

One aspect of the present invention pertains to a method for manufacturing a vehicle driveline assembly that includes rotating bearings. Preferably, some embodiments include fabricating at least one component of the vehicle driveline assembly that includes either an inner race, outer race, or cage for the bearings. Yet other embodiments preferably include through-hardening the component to a first hardness. Still other embodiments include masking at least a portion of the surfaces of the component that are not bearing contact surfaces, and surface hardening the bearing contact surfaces of the component to a second hardness that is harder than the first hardness.

Yet another aspect of various embodiments of the present invention pertains to a universal joint such as a Cardan joint. Some embodiments include a cruciform-shaped member having a two pairs of inner bearing races. Still other embodiments include a two pairs of end caps each including an outer bearing race adapted and configured to form a bearing pathway with a corresponding inner bearing race. Still further embodiments include that the cruciform-shaped member and the end caps are hardened to a lesser degree than the hardness of the inner races or the outer races, which are hardened to a greater degree that the end cap or member, respectively.

BRIEF DESCRIPTION OF THE DRAWINGS

Some of the figures shown herein may include dimensions. Further, the figures shown herein may have been created from scaled drawings, scaled models, or from photographs that are scalable. It is understood that such dimensions, or the relative scaling within a figure, are by way of example, and not to be construed as limiting unless so stated in a claim. Persons of ordinary skill will also recognize that CAD renderings may include lines that pertain to changes in the computer model, and not necessarily to component features.

ELEMENT NUMBERING

The following is a list of element numbers used with all of the embodiments, and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 10 | joint |
| 11 | cruciform-shaped member |
| 11.1 | leg |
| 11.2 | end |
| 11.3 | central hub |
| 12 | inner race |
| 12.1 | bearing groove |
| 13a | bearing contact surface areas |
| 13b | non-contact surface areas |
| 14 | bearing cage |
| 15 | yoke |
| 16 | bearings; balls; needles; tapered rollers |
| 18 | housing or outer race; bearing cap |
| 19a | ball contact surface areas |
| 19b | non-contact surface areas |
| 20 | stub |
| 22 | opening |
| 24 | window |
| 25a | ball contact surface, window |
| 25b | non-carburized surface, window |
| 26 | first ring |
| 28 | second ring |
| 30 | webs |
| 32 | outer surface; non-contact surface |
| 34 | inner surface; non-contact surface |
| 36 | body portion |
| 38 | end portion |
| 40 | sidewalls |

DETAILED DESCRIPTION OF ONE OR MORE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional."

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various references may be made to one or more methods of manufacturing. It is understood that these are by way of example only, and various embodiments of the invention can be fabricated in a wide variety of ways, such as by casting, sintering, sputtering, welding, electrodischarge machining, milling, as examples.

This document may use different words to describe the same element number. It is understood that such multiple, different words are not intended to provide a redefinition of any language herein. It is understood that such words demonstrate that the particular feature can be considered in various linguistical ways, such ways not necessarily being additive or exclusive.

Figure 1:
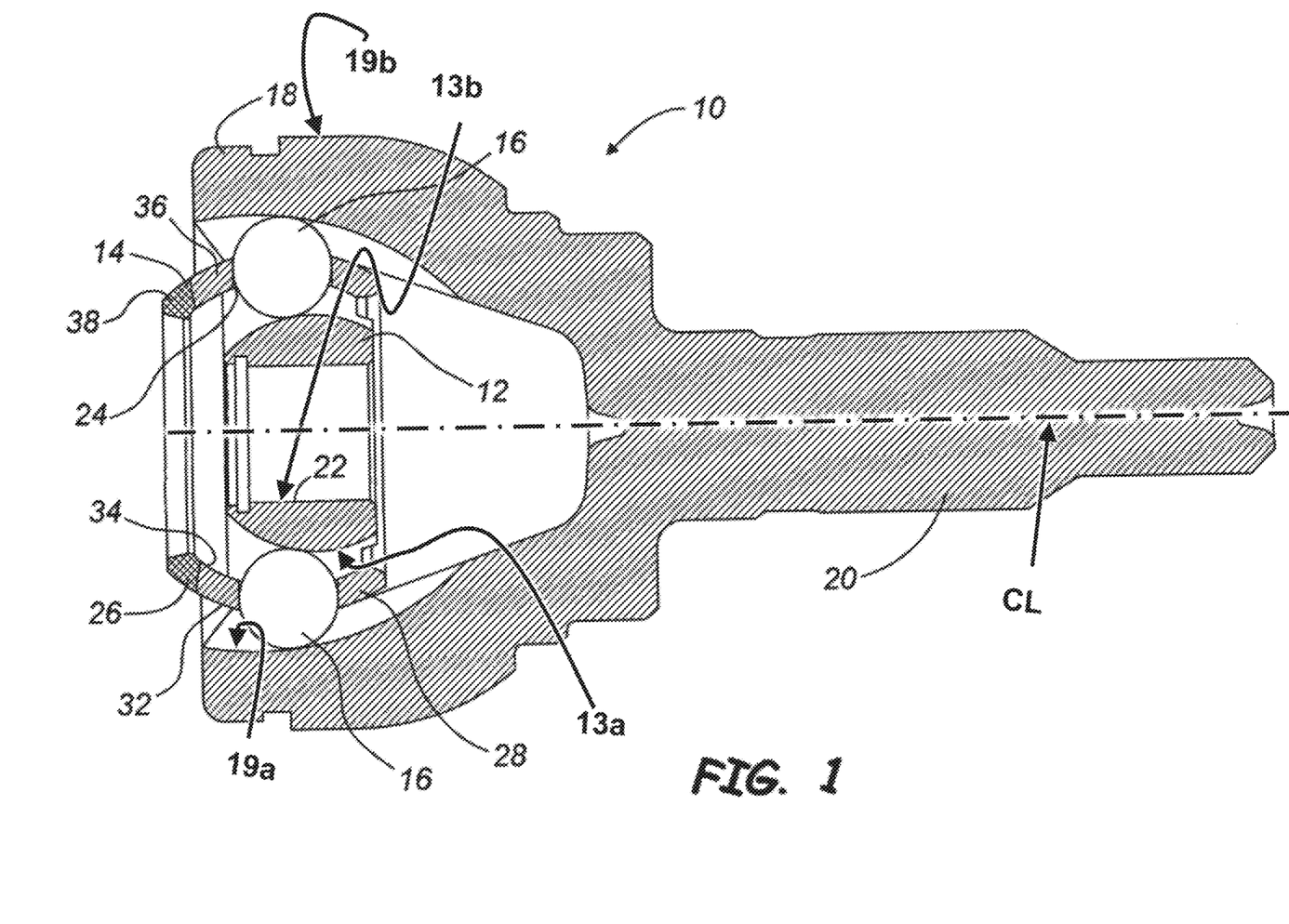
FIG. 1 is a side cross-sectional view of a universal joint in accordance with one embodiment of the present invention and showing a ball cage positioned between and inner and outer race.

As shown in FIG. 1, a constant velocity (CV) universal joint 10 according to one embodiment of the present invention includes an inner race 12, a ball cage 14, and a plurality of balls 16 housed within a housing or outer race 18. The joint 10 according to the present invention is used to couple two rotating shafts (not shown) together. A first shaft (not shown) is splined to a stub 20 that is formed as part of the housing or outer race 18. A second shaft (not shown) is splined to an opening 22 formed within the inner race 12. For example, a wheel hub of a vehicle could be coupled to the stub 20 and a transaxle could be coupled to the inner race 12. The balls 16 are positioned within windows 24 of the ball cage 14 to facilitate rotational and angular movement of the inner race 12, the cage 14, and the outer race 18 relative to one another.

Figure 2:
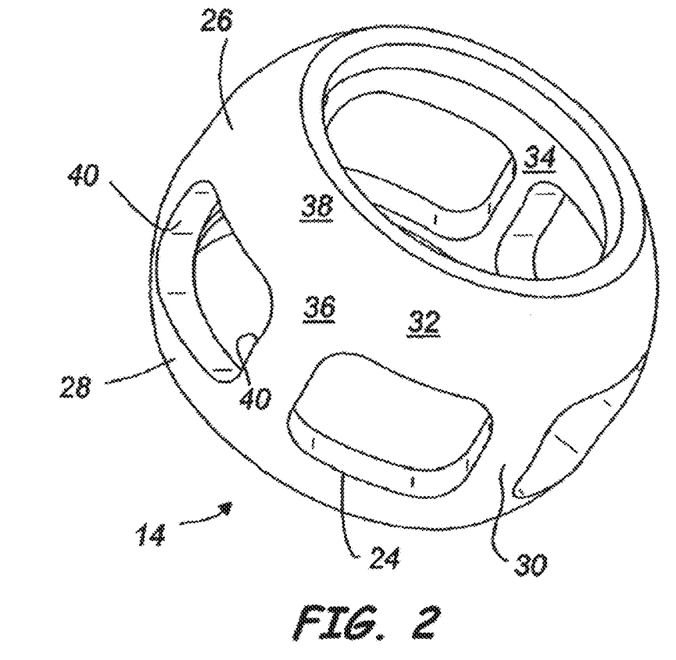
FIG. 2 is a perspective view of the ball cage of FIG. 1 including first and second rings spaced apart and coupled by webs.
Figure 3:
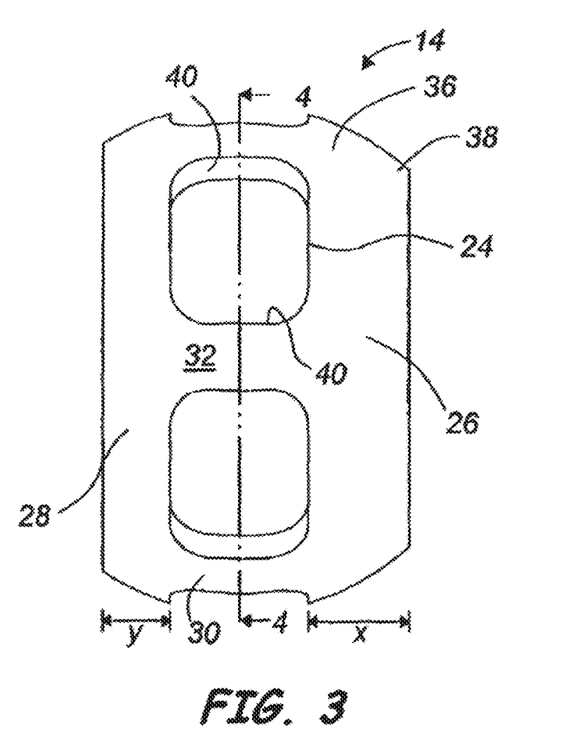
FIG. 3 is a side view of the cage of FIG. 1.

Referring to FIGS. 2-3, the ball cage 14 in some embodiments comprises a generally truncated spherical shape including a first ring 26 and a second ring 28 coupled by webs 30, all preferably integrally formed. The first and second rings 26, 28 are substantially parallel to and spaced apart from each other. The previously mentioned windows 24 are positioned between consecutive webs 30 and provide openings from an outer surface 32 of the cage 14 to an inner surface 34.

As best seen in FIG. 3, the first ring 26 includes a body portion 36 and an end portion 38, which preferably extends the first ring 26 further out from the windows 24 than the second ring 28. In other words, the width X of the first ring 26 is preferably greater than the width Y of the second ring 28. The widths X and Y can be measured linearly. For example, the cage 14 could be placed on a flat table and the height off the table of the edge of a window 24 could be measured. This would give one of the widths X or Y and the cage 14 could be flipped over and the measuring method repeated to measure the other of the widths X or Y.

As shown in FIG. 1, in some embodiments the end portion 38 provides additional extension of the first ring 26 as compared to the second ring 28, which is positioned closer than ring 26 to the stub 20 of the outer race or housing 18, thereby providing added material (e.g., steel) and thus strength to the cage 14 on the side remote from the stub 20. In some embodiments of the invention, the cage 14 may be selectively hardened so that the second ring 28, webs 30, and body portion 36 of the first ring 26 are of a first hardness and the end portion 38 of the first ring 26 is of a second, lesser hardness. The lesser hardness of the end portion 38 of the cage 14 gives more ductility to the cage 14 so that the end portion 38 of the cage 14 can plastically deform a little during movement of the various parts of the joint 10, rather than fail.

To harden the second ring 28 in some embodiments, webs 30, and body portion 36 of the first ring 26, most of the cage 14 is carburized to infuse carbon into the steel of the cage 14. Preferably, prior to the carburizing process, the entire cage 14 is hardened by heating and quenching, or other method. The end portion 38 is then masked during the carburization process so that it is not infused with carbon like the rest of the cage 14. In this way, the end portion 38 maintains a ductility and a lesser hardness than the hardened, unmasked, portions of the cage 14, i.e. the second ring 28, webs 30, and body portion 36 of the first ring 26.

It will be readily apparent to those of ordinary skill in the art that various materials can be used for the parts of the joint 10, including the cage 14, whether the end portion 38 is of a different hardness or the same hardness as the rest of the cage 14. For example, the entire cage 14 could be constructed of a thru-hardening grade steel (e.g., 4340 (53 $R_c$) steel), or other suitable material, or a carburizing grade steel (e.g., 8620 (60 $R_c$) steel), or other suitable material, wherein the end portion 38 may be masked during carburizing, so it maintains a lesser hardness (e.g., 34-45 $R_c$) than the rest of the cage 14.

Yet another embodiment of the present invention addresses the rapid wear seen in some universal joints. Some universal joints are fabricated from chromoly steels, and including chromoly steels having a medium content of carbon. Universal joints fabricated from this type of material obtain an advantage of higher strength and toughness as compared to other universal joints, such as OEM universal joints. However, some cages made out of chromoly steels (or other steels) have a disadvantage of wearing rapidly. So while the advantage of higher strength and toughness can be especially useful with rock crawlers and desert racers, their excessive wear in street vehicles can be a disadvantage.

In some applications, the components of a universal joint fabricated from chromoly steel have typically been through-hardened to about 10 Rockwell points less than the comparable OEM components. If fabricated to hardness values higher than this, the product (especially as used in a rock crawler or desert racer) may be subject to catastrophic failure in a brittle manner. This results from the dilemma that the wear properties of components such as the cage are directly related to surface hardness.

In some embodiments, there is a method of fabricating a universal joint that preserves the strength and toughness needed for off-road applications, while at the same time improving the wear characteristics and increasing the service life. This is achieved in some embodiments by selectively hardening the contact surfaces of the universal joint components that come into contact with the balls, while simultaneously leaving the hardness of the rest of the cage intact at a lower value of hardness. As one example, a component of a universal joint such as an outer race, inner race or a ball cage, is hardened in a typical heat treating process. The resulting hardness is a function of the carbon content of the material, as well as the quench and tempering process used. However, the hardness of certain selected surface areas of the component can achieve higher hardness than the through-hardened portions by undergoing a carburizing process or other process for case hardening, and especially those processes that result in an absorption of a material which exposed to an atmosphere of that material. In some embodiments, the carburizing may be accomplished in gas, vacuum, liquid, or pack carburizing processes. However, it is understood that yet other hardening treatments are contemplated, such as nitriding or nitrocarburizing.

In some components, it is preferable to avoid carburizing the surface of the entire component. Otherwise, the carburized whole part may be subject to brittle failure. Therefore, in some embodiments only the portions of the component that come into rolling contact with a bearing are carburized. In order to achieve this, other parts of the component that do not come into contact with the bearing are physically prevented to being subjected to the surface hardening process. As one example, the non-contact areas of the component can be masked with a material that prevents the surface hardening (such as by blocking the absorption of carbon). This masking material can then be removed from the bearing contact surfaces, and the partially unmasked component can then be subjected to case hardening.

In one embodiment, the component can be plated (with copper or other suitable material). The copper can then be machined away or otherwise removed from the bearing contact areas. The copper will block the diffusion of carbon during a carburizing process. The only areas of the component that will be hardened are those in which the masking (copper plating) has been removed.

Figures 4, 5A:
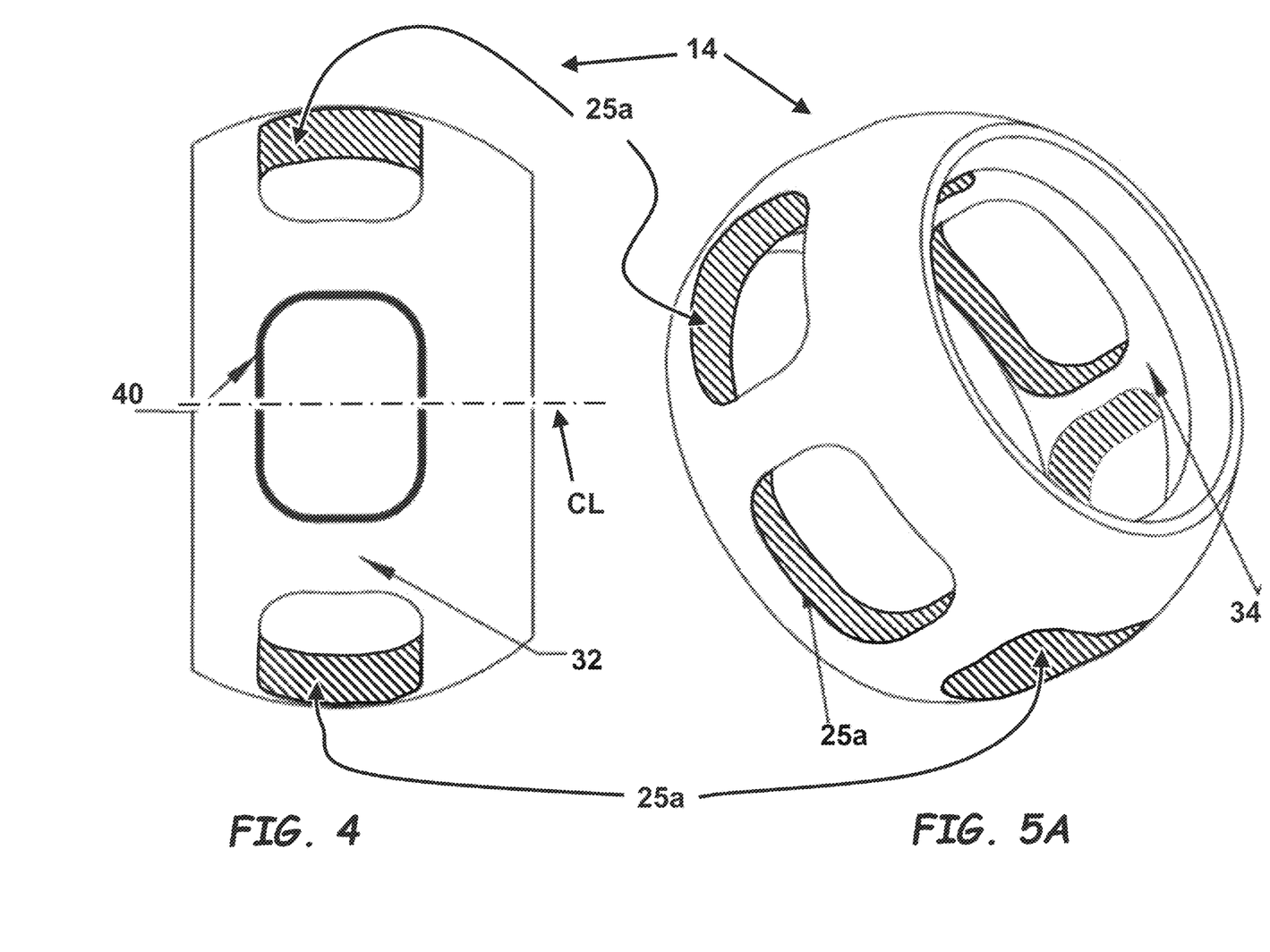
FIG. 4 is a side elevational view of a ball cage according to one embodiment of the present invention.
FIG. 5A is a perspective view of the ball cage of FIG. 4.
Figure 5B:
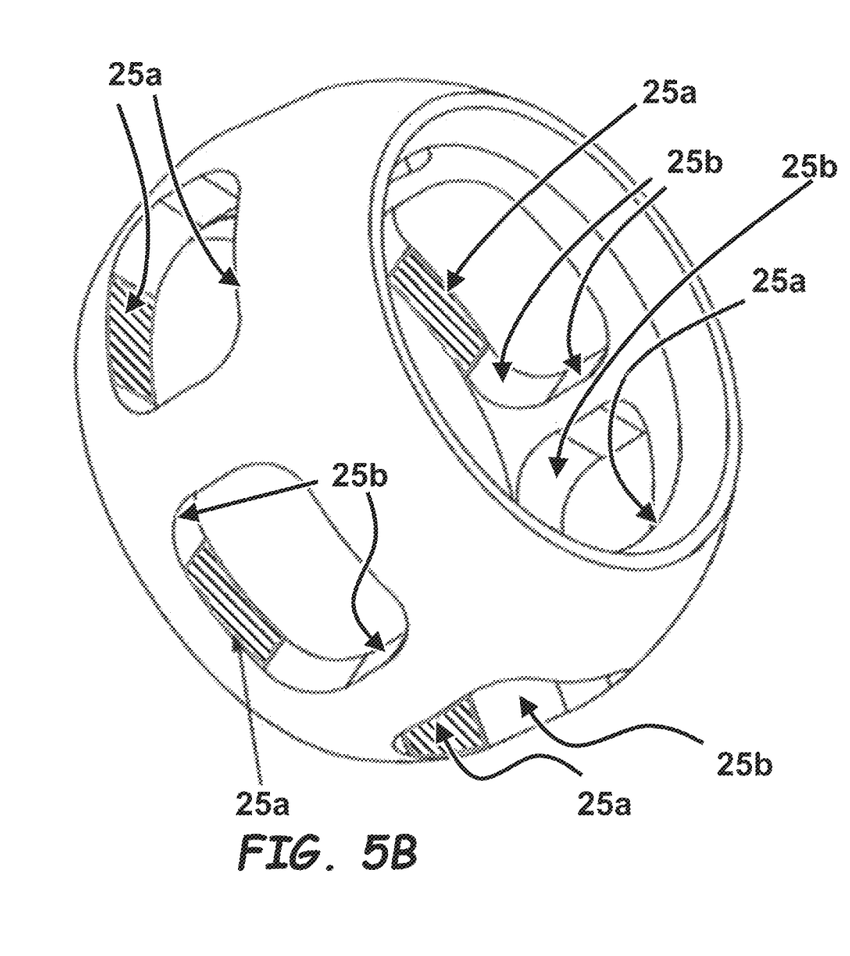
FIG. 5B shows an alternative configuration of additionally hardened areas for the ball cage of FIG. 5A.

FIGS. 4, 5A and 5B show a component such as a ball cage 14 that has been processed as described according to one embodiment of the present invention. It can be seen that the contact surfaces 25 surrounding each window 40 are cross hatched to represent a selective carburizing treatment applied at these ball contact areas 25. Preferably, the non-contact outer and inner surfaces 32 and 34, respectively, have been masked off with a material that prevents or greatly reduces any absorption of carbon or nitrogen. Any masking material that came into contact with the ball contact areas 25 is then removed. The entire component can then be subjected to a case hardening procedure, such as a carburizing treatment. The carbon will be absorbed only into the bearing contact areas, thereby increasing the hardness of areas 25 relative to the hardness of surface areas 32 and 34. The hardening of the entire component is preferably achieved before carburization, although other embodiments contemplate hardening of the entire component after carburization, consistent with maintaining the ball contact areas at a higher hardness.

FIG. 1 identifies other contact and non-contact surface areas on other components. For example, the inner race includes a ball contact surface area 13a on which a case hardening treatment such as carburizing or nitriding can be performed, with the non-contact surface areas 13b being suitably prevented (such as by masking) from such case hardening. Likewise, the outer race 18 includes an inner ball contact surface area 19a that can be subjected to the case hardening discussed above, whereas other portions of the outer race having non-contact surface areas 19b are not subjected to case hardening.

FIGS. 5A and 5B depict alternative configurations of the hardened window 24. Referring to FIG. 5A, it can be seen that substantially the entire surface area of the window (i.e., the surface facing the rotating bearing located within the window) is hardened as indicated by the cross hatching that extends substantially around the entire periphery of the window 24. This cross hatched portion is processed to a hardness that is harder than the hardness of the non-cross hatched areas. In some embodiments of the present invention, the additional processing to increase hardness in the unmasked areas is by carburization. However, yet other embodiments contemplate a second processing to increase the current hardness, including by nitriding, laser shock peening, or other processing methods compatible with the base material.

Various embodiments disclosed herein contemplate the use of 2 or more methods of material processing. As an example, for some materials and configurations a first processing act includes through hardening of the material, although yet other embodiments contemplate other any first processing that increase the overall hardness of the driveline component. For the components shown herein, the base material is about 0.40% carbon and yields an as-quenched hardness in the mid to upper 50's Rockwell.

After this first processing, another second processing act is applied to only selected areas of the component, such as the bearing contact surfaces. The non-selected areas are prevented from participating in the second processing act in any manner compatible with the particular process and the material and geometry of the component. As one example, the non-selected areas (such as the areas of the component that do not contact the bearings) are masked off by the application of copper plating, although other masking procedures are contemplated. The selected areas are then machined to remove the plating. The areas that have been machined free of copper develop roughly another 10 Rc points of surface hardness due to the carburization, although other embodiments of the present invention contemplate a second processing act that develop roughly another 5 Rc points of surface hardness due to the carburization. It has been found that carburization increases surface hardness, but in addition, provides an additional 0.030-0.060 inches of harder material that also resists deformation of the driveline component.

Referring to FIG. 5B, it can be seen that in an alternative embodiment the peripheral surface area of the window 24 is hardened on certain predetermined portions, with the other portions of the window being masked off during the carburizing (or other method) treatment. FIG. 5B shows that each portion 25a that receives the additional hardening is substantially perpendicular to the Centerline (CL) of cage 14, referring briefly to FIG. 4. It can be seen that the corners of the window are preferably not provided with the additional hardness, and in still further embodiments the sides of window periphery parallel to the Centerline are not provided with the additional hardening. In some embodiments, the cross hatched areas 25a of higher hardness incur most (or all) of the expected bearing contact.

Figure 6:
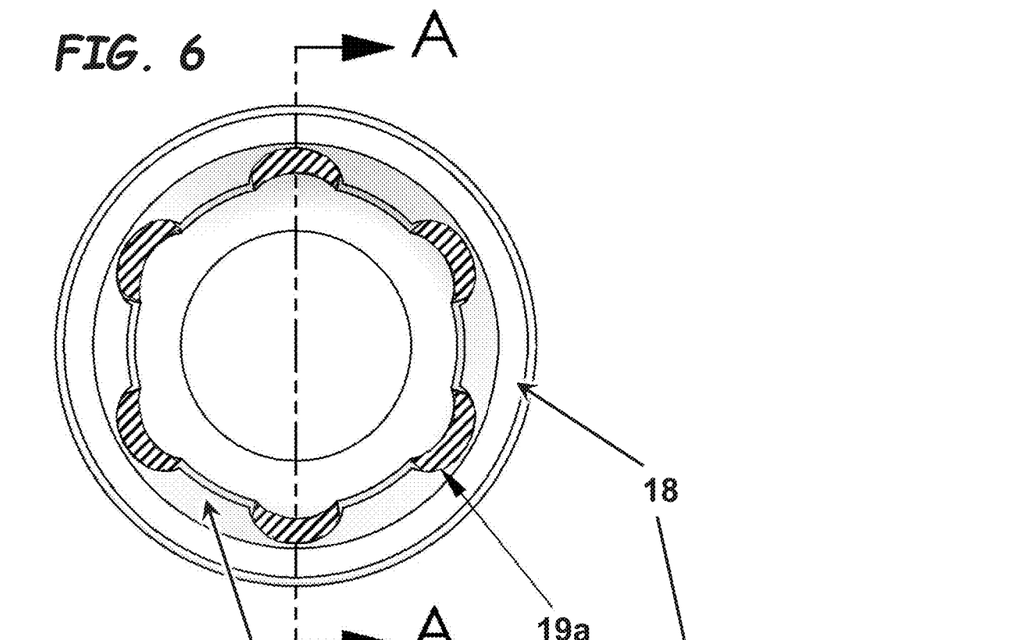
FIG. 6 is an end view from the large opened end of a housing 18 similar to, and representative of, the housing of FIG. 1 according to one embodiment of the present invention.
Figure 7:
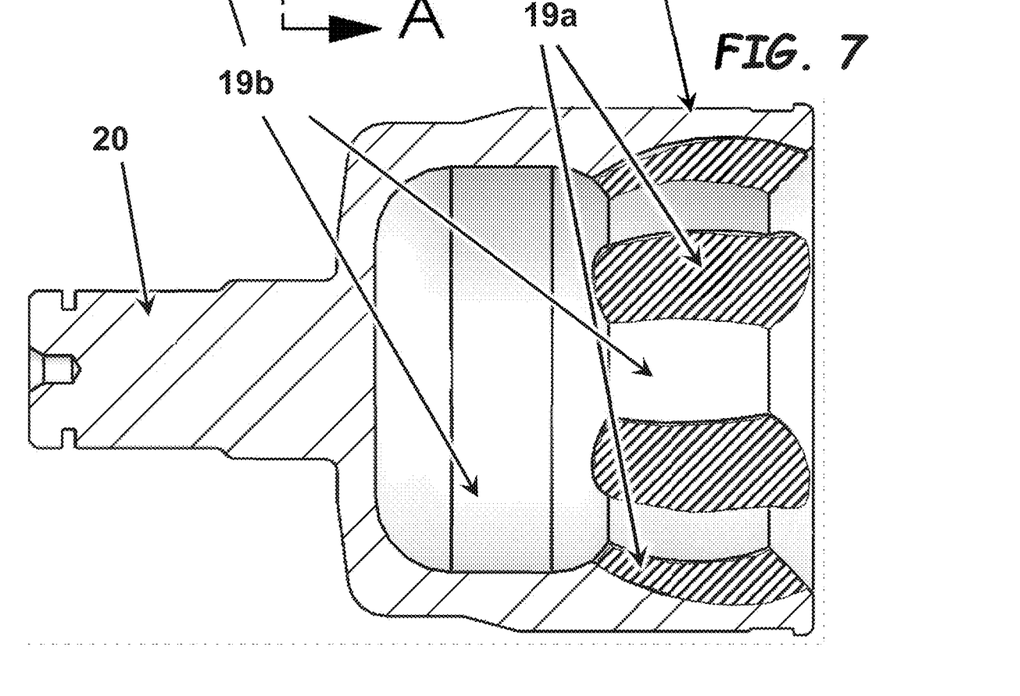
FIG. 7 is a cross sectional view of the apparatus of FIG. 6 as taken along line A-A of FIG. 6.

FIGS. 6 and 7 show end and side cutaway views, respectively, of a housing 18 for a constant velocity joint 10 similar to, and represented by, the CV joint of FIG. 1. It is understood that the housing and outer race of FIGS. 6 and 7 may differ in details and configuration, without detriment to any of the inventions shown herein.

FIGS. 6 and 7 show a housing 18 that is preferably a through-hardened component, and which has been hardened to have a first hardness. After the housing 18 has been through-hardened, the device is subjected to plating. The plating may be applied over the entire component, although in some embodiments the plating is applied to only those portions of the housing that are proximate to the bearing contact surfaces 19a. The plating is then removed in the bearing contact surface areas 19a. The plating remains on the surface areas 19b that will not contact the rotatable bearing. The partially plated housing 18 is then placed in a carburizing atmosphere, which results in the bearing contact areas 19a having an increased hardness due to the diffusion of carbon, such that the bearing contact areas are established to have a bearing contact hardness that is higher (harder) than the hardness in the non-contact areas 19b.

Figures 8, 9, 10:
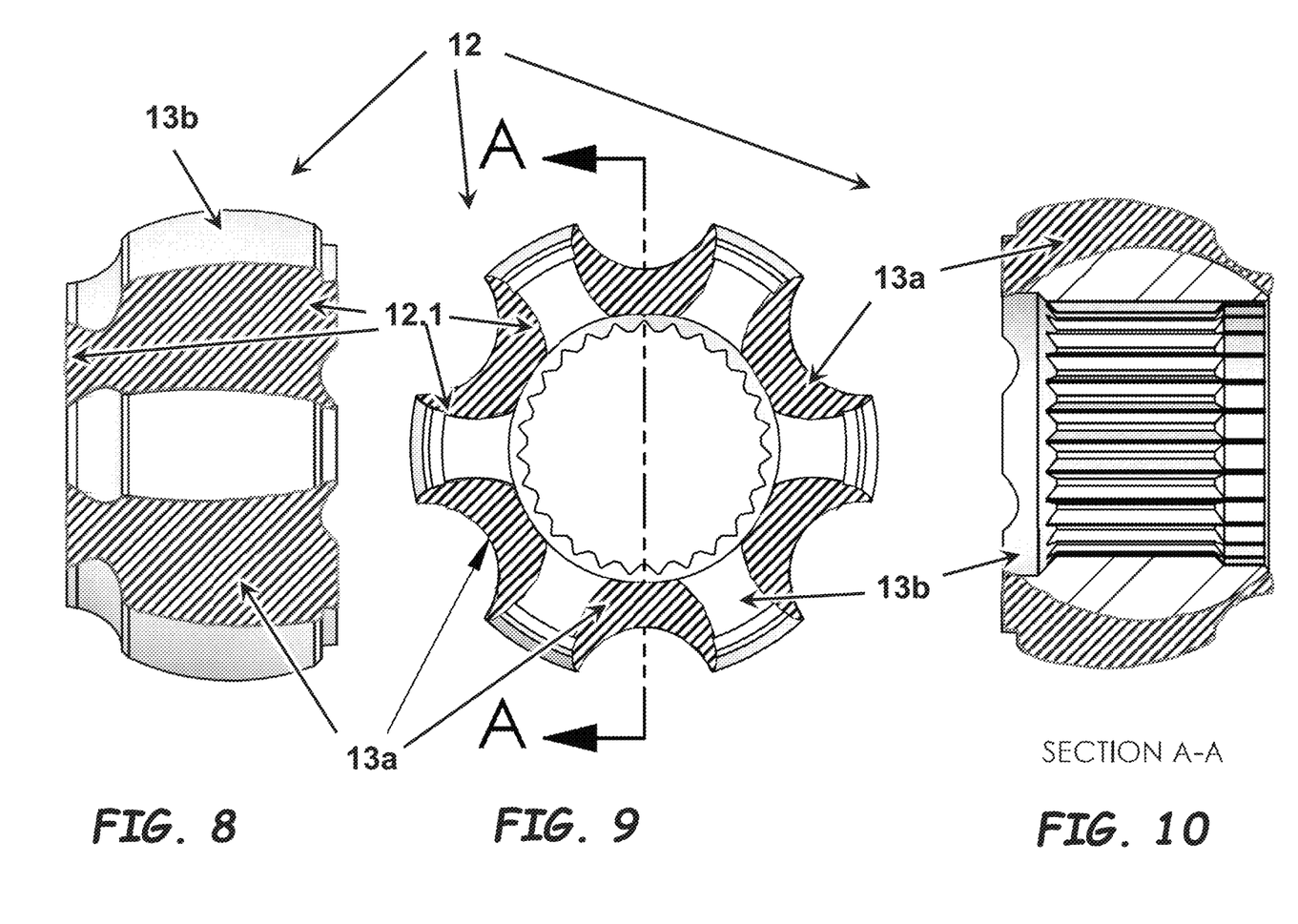
FIG. 8 is a side elevational view of an inner race according to one embodiment of the present invention that is similar to, and representative of, the inner race of FIG. 1.
FIG. 9 is an end view of the apparatus of FIG. 8, and presented orthogonally relative to FIG. 8.
FIG. 10 is a cross section of the apparatus of FIG. 9 as taken along line A-A of FIG. 9.

FIGS. 8-10 show side elevational, end, and cutaway views, respectively, of an inner race 12 for a constant velocity joint according to another embodiment of the present invention. The inner race depicted in FIGS. 8 through 10 is similar to the inner race shown on FIG. 1, although there may be various different features. These differences do not detract from the methods and apparatus of various embodiments of the various inventions described herein.

These figures show the plurality of bearing contact areas 13a that are circumferentially arranged around the splined central hub of inner race 12. It can be seen that in some embodiments that the six bearing grooves 12.1 is provided with the additional act of hardening after the initial hardening of the entire inner cage. However, in still further embodiments it is contemplated to apply the additional hardening only to selected areas of the groove 12.1, such as in the central "valley" of the groove, or such as on opposing sides of the groove, in a manner analogous to the reduced area of high hardness discussed for FIG. 5B. FIGS. 8-10 further show various portions 13b of inner race 12 that are not provided with the second hardening treatment.

Figures 11A, 11B:
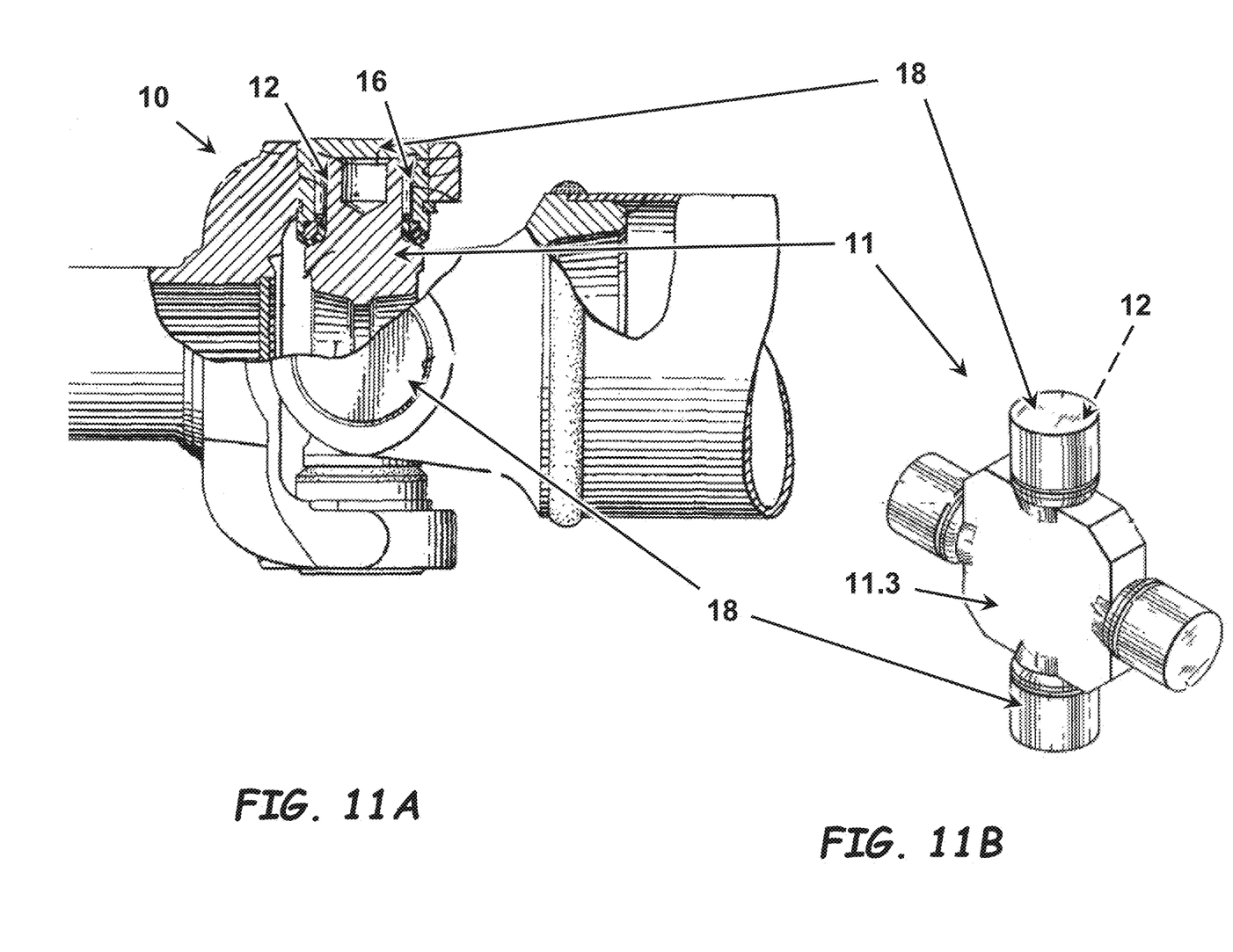
FIG. 11A is a side view of an assembled universal joint according to the prior art showing a side elevational view in partial cross section of the assembled joint.
FIG. 11B is a top, side, perspective representation of a prior art cruciform that is similar to, and representative of, the cruciform shown in FIG. 11A.

Still further embodiments of the present invention pertain to multiple hardening treatments and selective hardening treatments for portions of other driveline components, such as a Cardan joint. FIGS. 11A and 11B show exemplary depictions of an assembled Cardan joint (FIG. 11A) and a component of a typical Cardan joint (FIG. 11B). FIGS. 11A and 11B are copied from prior art devices shown in U.S. Pat. Nos. 3,159,013 and 3,446,507, respectively. It is understood that the component shown in FIGS. 12-16 are not the same as those shown in FIGS. 11A and 11B, without detracting from the various inventive methods and apparatus described herein.

It can be seen that the cruciform-shaped central connecting member 11 shown in FIG. 11B provides interconnection of the two yokes 15 (one driving, the other driven) as best seen in FIG. 11A. Two arms of a first yoke are attached by way of coupling to a pair of opposing bearing caps 18, and two arms of a second yoke 15 are coupled to the other pair of opposing bearing caps 18. FIG. 11B shows the assembly of cruciform-shaped member 11 with a plurality of bearing caps 18. Referring to FIG. 11A, it can be seen that in the placement of a cap 18 on an end of cruciform member 11 an annular space is created in which a plurality of needle bearings 16 are located, in a manner typical to many Cardan joints. FIG. 11A shows that each cap 18 includes an inner diameter that acts as an outer race for the bearing 16, and the outer diameter of the end of the cruciform member 11 acts as an inner race 12.

Figure 12:
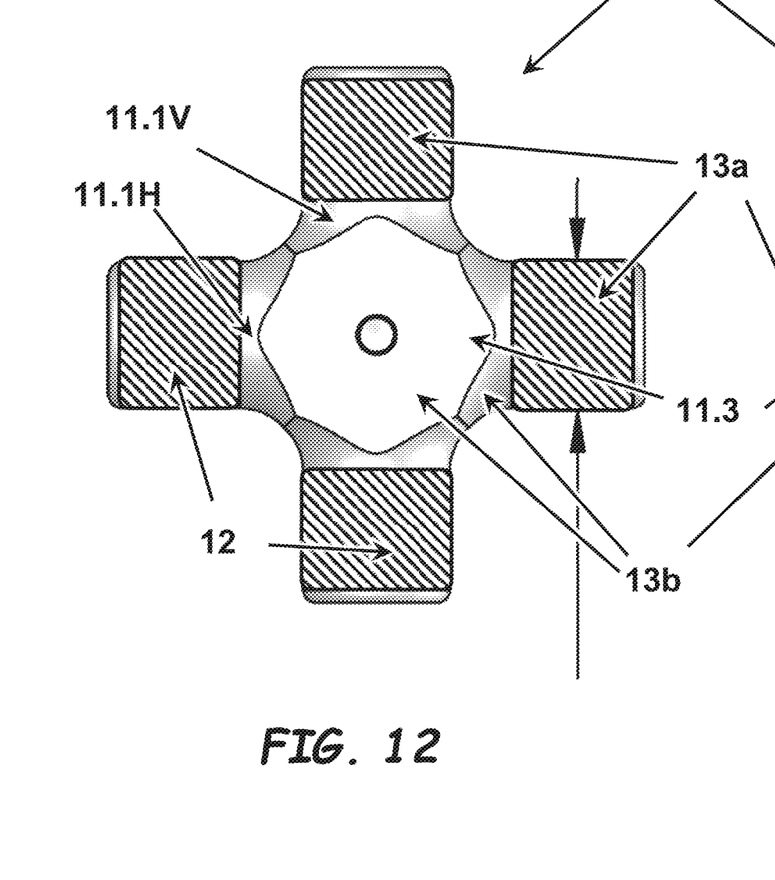
FIG. 12 is a side elevational view of a cruciform for a universal joint according to another embodiment of the present invention.
Figure 13:
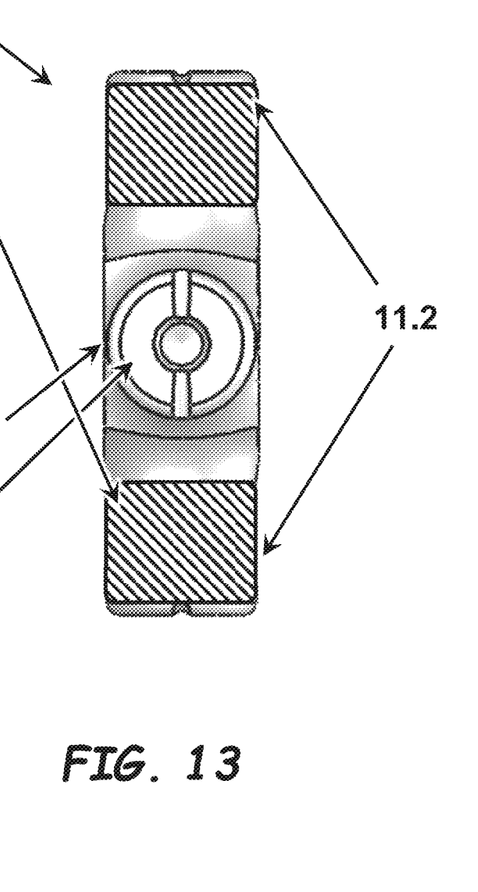
FIG. 13 is a side elevational view of the apparatus of FIG. 12, and represented orthogonally relative to FIG. 12.

FIGS. 12 and 13 show frontal and side elevational views, respectively, of a cruciform member 11 for a Cardan joint, according to one embodiment of the present invention. It can be seen that after the first act of hardening, preferably the entire cruciform member is masked, and the masking is removed in those cylindrical surfaces 13a that act as inner races in the assembled Cardan joint.

Referring to FIG. 12, the cruciform-shaped member 11 includes a vertical leg 11.1V and a horizontal leg 11.1H, which join together in a central hub 11.3. Referring to FIG. 13, it can be seen that vertical leg 11.1V includes opposite ends 11.2, which is also the configuration of horizontal leg 11.1H. A portion of the end 11.2 of each leg is preferably exposed to the second, higher hardening heat treatment. Other portions of cruciform-shaped member 11 such as the areas 13b that do not contact the rotating bearings, retain their masking so as to not be hardened by the second act of hardening.

Figure 14:
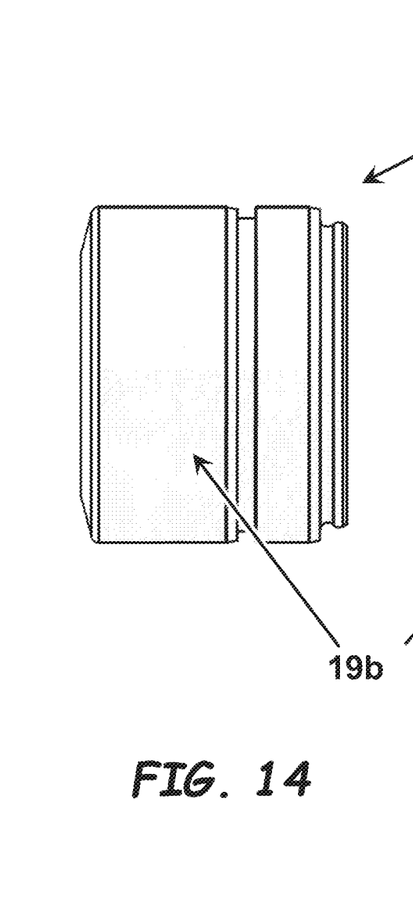
FIG. 14 is a side elevational view of a bearing cap for a universal joint according to another embodiment of the present invention.
Figure 15:
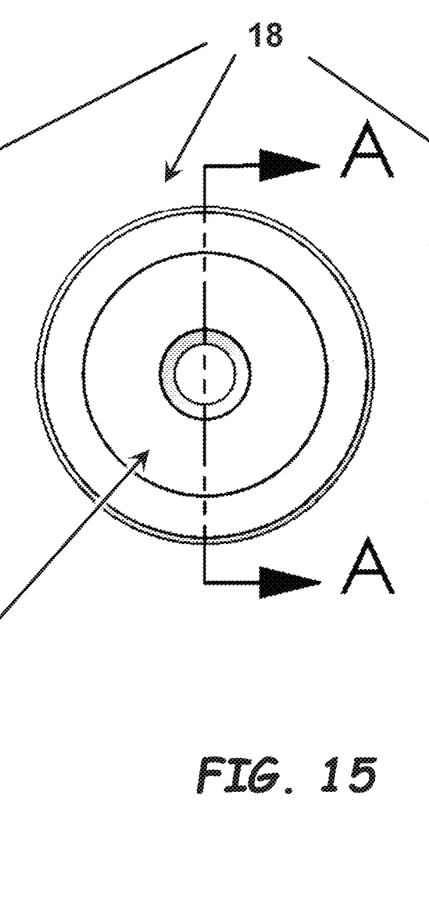
FIG. 15 is an end view of the apparatus of FIG. 14.
Figure 16:
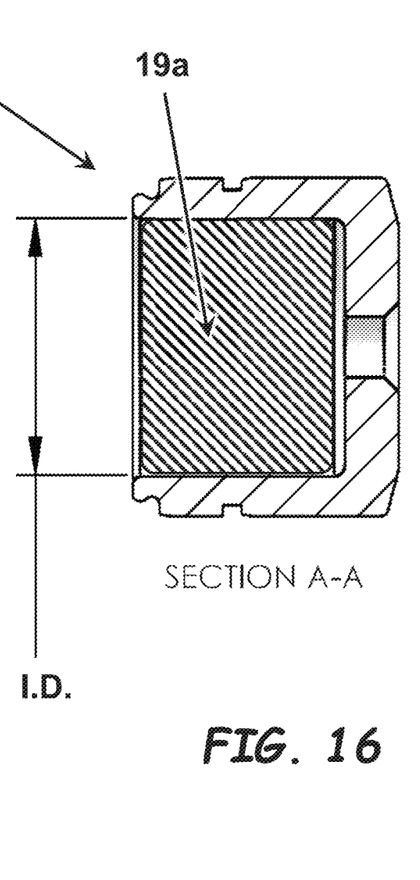
FIG. 16 is a side elevational cross sectional representation of the apparatus of FIG. 15 as taken along line A-A of FIG. 15.

FIGS. 14-16 show various views of an end cap 18 that provides an outer race for a Cardan joint. It can be seen that end cap (or bearing cap) 18 in some embodiments comprises a cylindrical body that is open on one end and closed on the other end, although other embodiments of the present invention contemplate outer races of any configuration. Referring to FIG. 16, it can be seen that the inner diameter of cap 18 is hardened with this second act of hardening, as indicated by the cross hatched area. Preferably, most or all of the non-contact surface area 19b remains masked during the second act of hardening (e.g., carburizing).

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

The invention claimed is:

1. A method for manufacturing a universal joint having a plurality of rolling bearings, comprising:
    fabricating from a Chromoly steel at least one component of a universal joint selected from the group consisting of an outer race adapted and configured for a rolling bearing, an inner race adapted and configured for a rolling bearing, a cruciform-shaped member, a bearing cap adapted and configured to provide a rolling bearing pathway with a cruciform-shaped member, or a rolling bearing cage;
    through-hardening the component to a first hardness;
    masking at least a portion of the surfaces of the component that are not bearing contact surfaces; and
    surface hardening the bearing contact surfaces of the component to a second hardness that is harder than the first hardness.

2. The method of claim 1 wherein the rolling bearing is a ball bearing and the component is a ball bearing cage.

3. The method of claim 1 wherein said surface hardening is by carburizing.

4. The method of claim 1 wherein said masking is with a material that blocks diffusion into the surface.

5. The method of claim 1 wherein the rolling bearing is a ball bearing and said masking includes masking portions of at least a portion of the ball bearing contact surfaces of the component and removing the masking from at least a portion of the ball bearing contact surfaces before said surface hardening.

6. The method of claim 5 wherein said masking is by plating.

7. The method of claim 6 wherein said removing is by machining the masked surface.

8. The method of claim 5 wherein said masking is by copper plating.

9. The method of claim 8 wherein said removing is by removing the copper plating.

\* \* \* \* \*